United States Patent
English et al.

(10) Patent No.: US 6,787,078 B2
(45) Date of Patent: Sep. 7, 2004

(54) PROCESS FOR PRODUCING A MULTI-LAYERED FOAM ARTICLE AND ARTICLES PRODUCED THEREFROM

(75) Inventors: Steven English, Midland, MI (US); Katherine J. Bladon, Brights Grove (CA); Jose Godoy, Geneva (CH); Alfredo B. Larre, Lake Jackson, TX (US); Andrew M. Hogg, Bennau (CH)

(73) Assignee: Dow Global Technologies Inc., Midland, MI (US)

( * ) Notice: Subject to any disclaimer, the term of this patent is extended or adjusted under 35 U.S.C. 154(b) by 40 days.

(21) Appl. No.: 10/172,775

(22) Filed: Jun. 14, 2002

(65) Prior Publication Data

US 2003/0098598 A1 May 29, 2003

Related U.S. Application Data

(60) Provisional application No. 60/298,709, filed on Jun. 15, 2001.

(51) Int. Cl.[7] .............................................. B29C 44/06
(52) U.S. Cl. ..................... 264/46.4; 264/45.1; 264/242; 264/255; 264/338
(58) Field of Search ................................ 264/242, 338, 264/45.1, 46.4

(56) References Cited

U.S. PATENT DOCUMENTS

| | | | |
|---|---|---|---|
| 3,635,808 A | * 1/1972 | Elevitch | 204/620 |
| 3,847,720 A | 11/1974 | Laberinti | 161/159 |
| 3,887,735 A | 6/1975 | Laberinti | 428/71 |
| 3,929,026 A | 12/1975 | Hofmann | 74/237 |
| 4,015,041 A | 3/1977 | Koschatzky et al. | 428/310 |
| 4,042,314 A | * 8/1977 | Bruning et al. | 425/89 |
| 4,179,325 A | * 12/1979 | Staats et al. | 156/498 |
| 4,338,271 A | * 7/1982 | Kumasaka et al. | 264/54 |
| 4,656,722 A | * 4/1987 | Armstrong | 29/527.2 |
| 5,000,515 A | * 3/1991 | Deview | 297/452.27 |
| 5,409,648 A | * 4/1995 | Reidel | 264/45.1 |
| 5,452,622 A | * 9/1995 | Fenelon | 74/411 |
| 6,391,232 B1 | * 5/2002 | Fritsch | 264/46.6 |
| 6,413,177 B1 | * 7/2002 | Guenther et al. | 473/605 |

FOREIGN PATENT DOCUMENTS

| | | |
|---|---|---|
| EP | 0251659 | 1/1988 |
| EP | 0386818 | 12/1990 |
| EP | 0425240 | 5/1991 |
| JP | 49038699 | 10/1974 |
| WO | WO 87/00122 | 1/1987 |
| WO | WO 98/25748 | 6/1998 |
| WO | WO 01/32392 | 5/2001 |
| WO | WO 01/32413 | 5/2001 |

* cited by examiner

*Primary Examiner*—Allan R. Kuhns

(57) ABSTRACT

A process for producing a multi-layered article having a soft, leather-like feel comprising first introducing into a suitable mold a first liquid formulation designed to produce the top elastomeric layer on the finished article. A release agent is then applied on the elastomeric layer in the area where it is desired not to have adherence of the elastomer to the foam. Before the elastomeric layer is completely cured, a second liquid foam producing formulation, designed to produce a soft foam, is poured into the open mold. The elastomeric layer of the resulting article is integrally attached to the foam in the areas not containing the release agent.

16 Claims, 3 Drawing Sheets

PROCESS FOR PRODUCING A MULTI-LAYERED FOAM ARTICLE AND ARTICLES PRODUCED THEREFROM

SPECIFICATION

This application claims priority from U.S. Provisional Application Ser. No. 60/298,709 filed Jun. 15, 2001.

FIELD OF THE INVENTION

The present invention relates to a process of preparing multi-layered foam articles and to the resulting articles which exhibit a soft, leather-like feel. In a preferred embodiment, the invention relates to seats for transportation vehicles produced by such processes.

BACKGROUND OF THE INVENTION

The molded foam portion of a seat, particularly seats for transportation vehicles such as automobiles, is generally composed of two or more foams of different hardness. Multi-layered or multi-hardness polyurethane foams are defined as layers of foams of different hardness (load bearing) and/or densities. These foams are usually used to make seat cushions or squabs which have high SAG factors (that is, the ratio of hardness at high deflection to hardness at low deflection) and superior comfort, especially regarding H-point retention (seat occupant's vertical position).

Various methods are known in the art for preparation of multi-layered polyurethane foams. Such processes are disclosed, for example, in U.S. Pat. No. 3,847,720, U.S. Pat. No. 4,015,041, U.S. Pat. No. 3,887,735, U.S. Pat. No. 4,190,697, EP Patent Publications 251,659 and 279,324 and WO Publication 98/25748. Such methods include applying a liquid mixture of a first polyurethane forming layer into the mold and then pouring, prior to the final curing of the first polyurethane forming layer, a liquid mixture of a second polyurethane forming layer. The two polyurethane layers are then cured. While seats produced by such processes have good wear properties, they fail to measure up to the comfort level expected of some users.

It would be advantageous to produce multi-layered foam articles for use in seats for transportation vehicles and other applications, which are durable and exhibit a high comfort level. It would also be advantageous for such foamed articles to have a durable outer or top layer which is aesthetically and texturally pleasing to the consumer.

SUMMARY OF THE INVENTION

The invention is directed to a process for producing multi-layered foam articles, particularly seats for transportation vehicles, such as automobiles, having an elastomeric top layer and a bottom layer. The elastomeric layer is adhered to the bottom foam layer in some areas and not adhered to the bottom foam layer in other areas. The elastomeric top layer may have a grain or pattern to meet individual style requirements.

In a preferred embodiment, the resulting article is defined by an inner zone and one or more raised supports peripheral to the inner zone. In light of its softness and leather-like feel, the resulting article renders a high degree of comfort. In particular, the resulting article has a soft, leather-like feel on its top surface since the elastomeric layer is not completely attached to the bottom foam layer. This is an advantage over the prior art which describes a top elastomeric layer completely attached to the bottom foam layer. The resulting article is cheaper than leather coverings since it is made of less expensive materials.

The process of the invention consists of applying a first formulation capable of forming an elastomeric layer into a mold, applying a release agent to the elastomeric layer in the section of the mold where it is desired to have the elastomer not adhered to the bottom foam layer and then, before the elastomeric forming formulation has cured, pouring into the mold a second formulation capable of producing a foam. After the first elastomeric forming formulation and second formulations have been sufficiently cured, the article is removed from the mold. The portion of the article that is in contact during use with the consumer is the elastomeric layer. The elastomeric layer of the inverted molded article is not attached to the bottom foam layer in the areas where the release agent is applied. The presence of the release agent where the release agent is applied prevents adherence of the foam layer to the elastomeric layer.

BRIEF DESCRIPTION OF THE DRAWINGS

In order to more fully understand the drawings referred to in the detailed description of the present invention, a brief description of each drawing is presented, in which.

DETAILED DESCRIPTION OF PREFERRED EMBODIMENTS

The process of the present invention is particularly applicable for producing a seat for a transportation vehicle, as well as indoor and outdoor furniture. (As used herein, "seat" refers to the back and/or seat portion). Examples of transportation vehicles include bicycles, automobiles, aircraft, buses, trains, boats, trucks, tractors, etc. Indoor and outdoor furniture includes such items as patio furniture, stadium seats, home and office furniture, etc. In addition, the process can be used to produce a sound or thermal insulation panel, such as for making portable coolers and office partitions.

Figure 1:
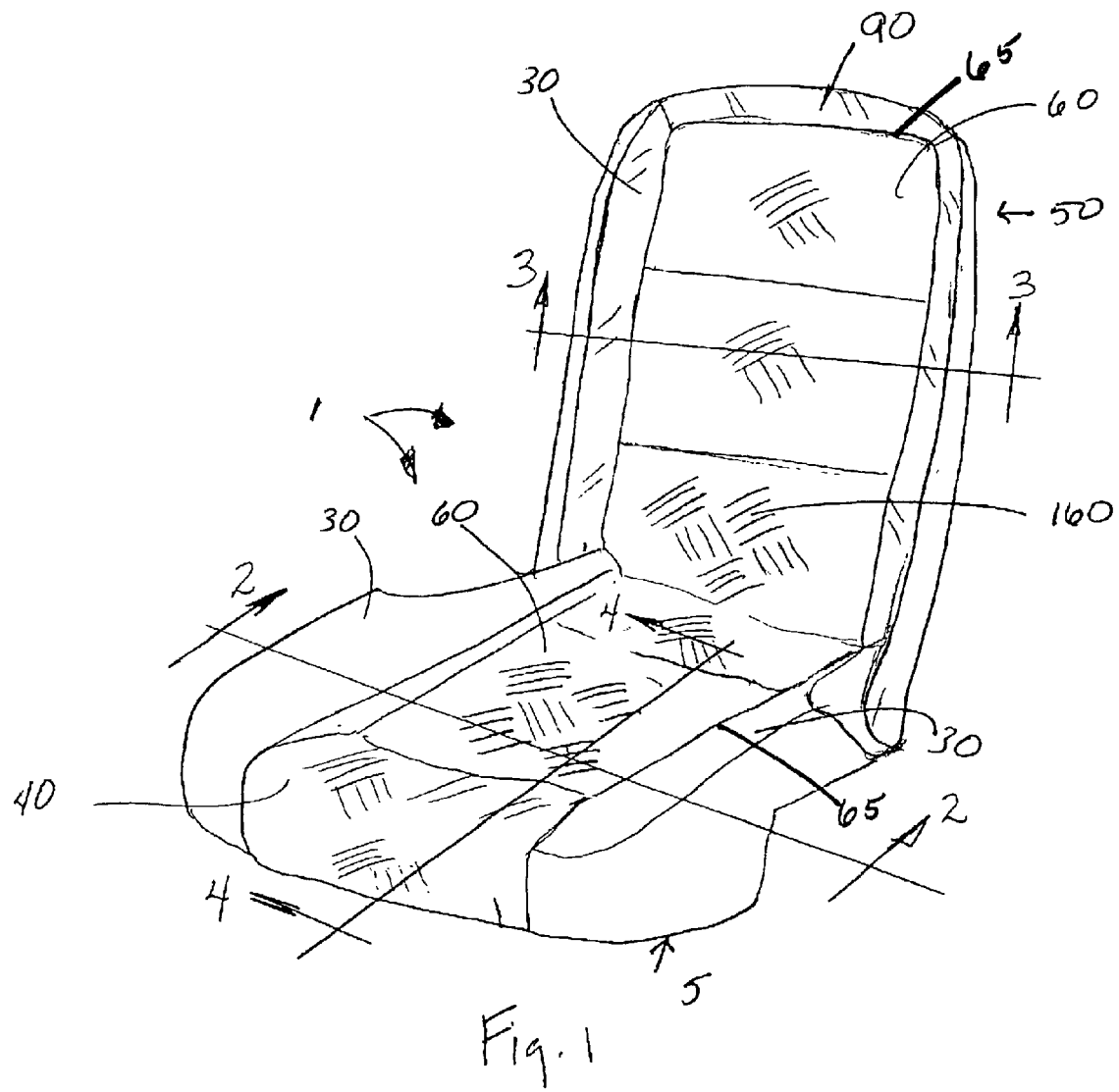
FIG. 1 is a perspective view of the seating and back portions of a seat of a transportation vehicle having a raised support.

Referring to FIG. 1, multi-layered articles produced in accordance with the invention, include seats for transportation vehicles. The seat 1 has a seat portion 5 and/or back portion 50. The seat portion 5 and/or back portion 50 have an inner zone 60 and at least one raised side support 30 on either side of the inner zone which may be separated by style lines 65.

In an alternative embodiment, seat portion 1 may further contain a frontal raised support 40, with raised side supports 30. FIG. 1 further shows an alternative embodiment wherein the back portion 50 of the seat further contains a top raised support 90, preferably with back side raised support(s) 30.

In the process of the invention, the mold release agent is applied to pre-defined portions of the mold. Since application of the release agent will cause the elastomer to avoid adherence to the bottom foam layer, the manufacturer has a wide variety of choices and need only to apply the release agent to effectuate his desired choice of design. For instance, if the manufacturer wanted to have the elastomeric layer adhered to the bottom foam layer only along style lines 65, he would apply the release agent to all areas of the mold except those areas corresponding to the style lines.

Figure 2:
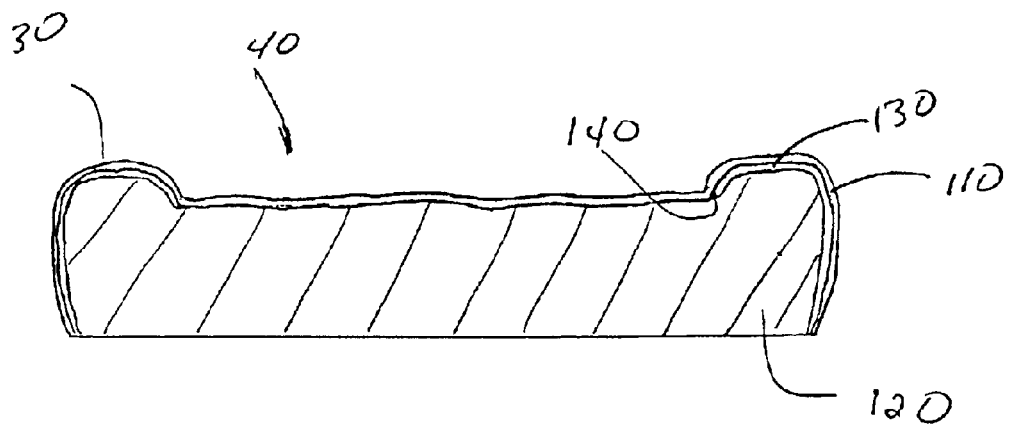
FIG. 2 is a cross-sectional through Section 2—2 as shown in FIG. 1.
Figure 4:
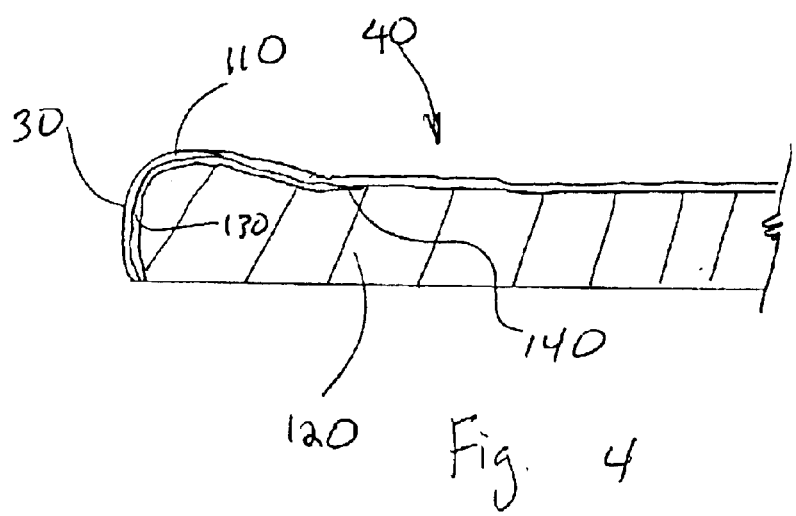
FIG. 4 is a cross-sectional through Section 4—4 shown in FIG. 1.
Figure 3:
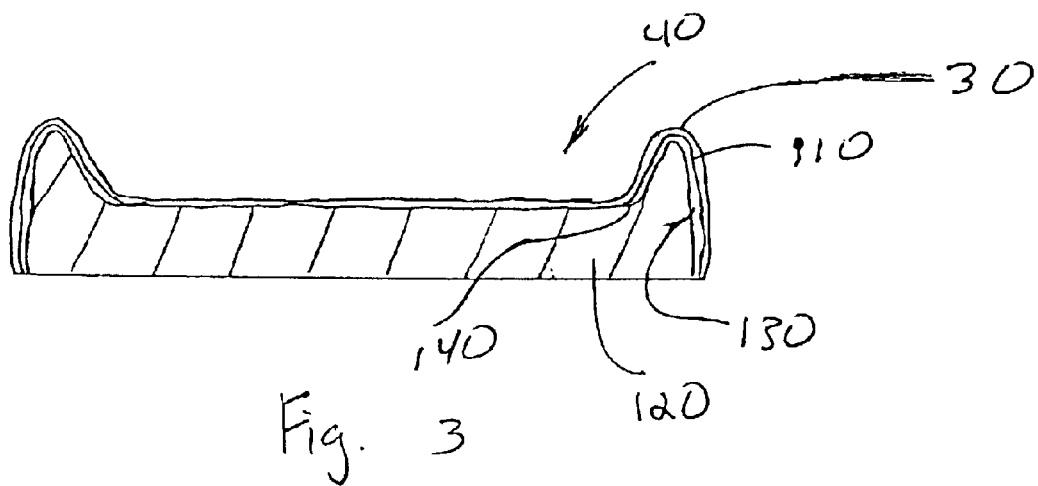
FIG. 3 is a cross-sectional through Section 3—3 as shown in FIG. 1.

In a preferred embodiment, the release agent is applied only to that portion of the mold which conforms to the raised support, i.e., either the frontal support 40, top raised support 90, or side support(s) 30. FIGS. 2, 3, and 4 represent cross sectional views showing the arrangement of mold release layer in these areas. FIG. 2 is a cross-section through section 2—2 of seat portion 5. FIG. 3 is a cross-section through section 3—3 of back portion 50. FIG. 4 is a cross-section through section 4—4 of seat portion 5 with optional frontal support 40. The elastomeric layer is represented by 110 and the foam layer is represented by 120. The mold release layer is represented by 130. Mold release layer 130 extends from the junction 140 of inner zone 40 and raised side support 30. The present invention gives a layered article with a well defined common boundary between the layers, good vibration properties, and a durable upper elastomeric layer.

Figure 5:
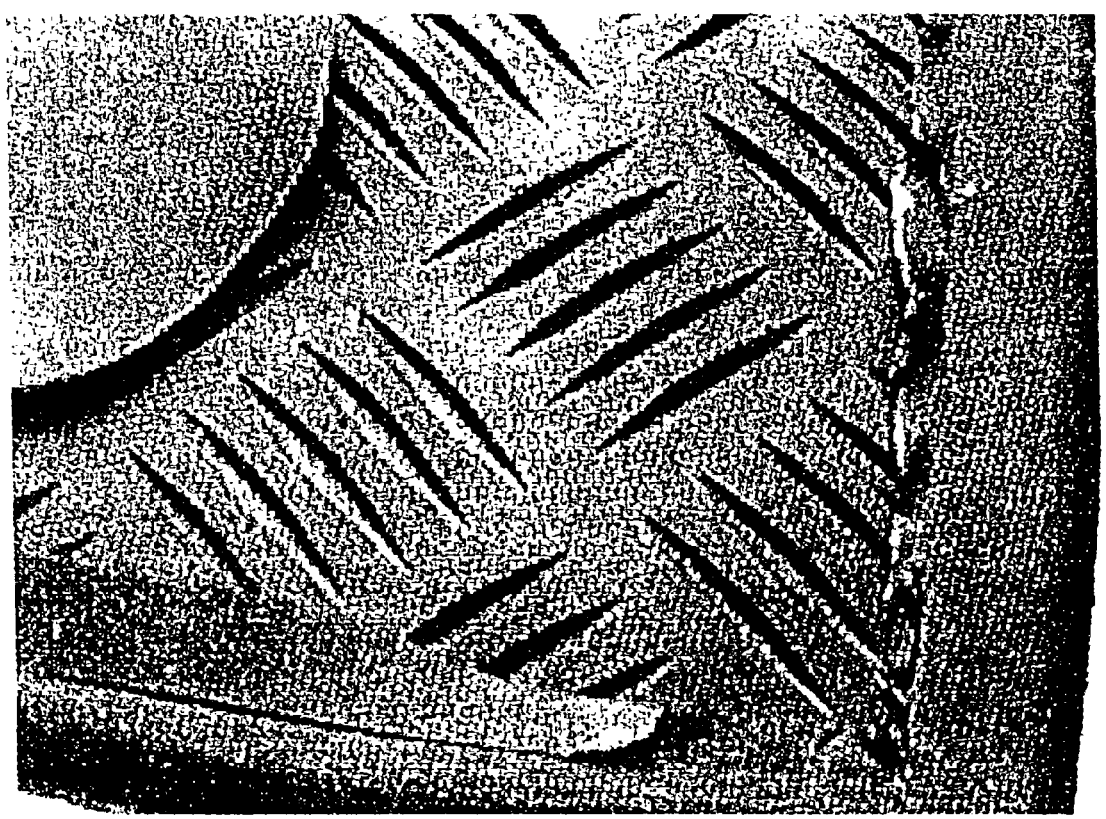
FIG. 5 is a side view of a seat of the invention having an exemplary decorative pattern.

The articles are inverted after demolding. The mold can have the negative imprint of a design desired on the molded product. As set forth in FIGS. 1 and 5, the top elastomeric layer exhibits the desired design 160. Most preferred negative imprints are those which afford to molded seats some relief (raised or indented pattern) on the durable, top elastomeric layer.

The process of the invention can be operated in various mold configurations or varying process conditions. The process can be operated either in a mold having the bottom surface flat to the horizontal plane or in a mold having the bottom surface inclined. The degree of inclination for a particular mold can readily be determined by one skilled in the art. The formulations may also be poured into a mold and subsequently at least one end of the mold raised to form an angle with the horizontal plane. This inclination of the mold bottom surface may be achieved by actually tilting the mold or by employing a mold, which has been manufactured with an inclined bottom surface. For most conventional automobile seat molds, the incline in the mold running from the back to the front of the seat is sufficient for the purposes of this invention. Generally the angle of incline is from 0.1 to 60 degrees. Preferably, the angle of incline is 2 to 40 degrees. More preferably the angle of incline 4 to 20 degrees and most preferably 5 to 12 degrees.

Low or high pressure, up to 250 bars, single mixing head or multiple mixing heads mounted on a 5-axes robot arm, or on a 2-axes manipulator is suitably used in the process of the present invention. A single mixing head capable of pouring the formulations sequentially, or multiple mixing heads with independent manipulators can be used in the process of the present invention. Mixing heads having two or more, up to eight, preferably two to four, additives and polyol blends streams and one, two or more isocyanate streams are suitable for use in the process of the present invention. The speed of mixing heads can be varied during the pouring of different formulations or the mixing heads can even be stopped for a short interval of time at some point above the mold to increase pouring time in a particular zone in the mold. If multiple mixing heads are used, the distance between outlets and their respective positions can be varied depending on the molding conditions.

In one embodiment of the present invention, the formulations are poured simultaneously from at least two mixing head outlets strip-wise into the inner zone of the mold along different lines whilst the mixing heads move above and across the inner zone of the mold. Alternatively, the mold can move relative to the mixing head outlet(s) during the pouring of the liquid formulations.

In another embodiment of the present invention, the first elastomeric forming formulation designed to produce the elastomeric layer is poured strip-wise into the mold along the line parallel to and near to the external wall of the inner zone of the mold. After application of the mold release agent to the area where it is desired not to have adherence of the elastomer to the foam, the foam producing second formulation is poured strip-wise into the mold along the line parallel to but nearer to the external wall of the mold than the line of pouring of the first elastomeric forming formulation. The time interval between addition of the formulations will vary depending on various factors such as the reactivity of the polyols, amount of catalysts present, reactivity of the polyisocyanate component, etc. and can readily be determined by those skilled in the art. Preferably the time interval will be between 0.05 seconds to 3 minutes. More preferably the time interval will be from 0.05 seconds to 1 minute. Most preferably the time interval will be from 0.05 to 30 seconds.

Still in another embodiment of the present invention, the first elastomeric forming formulation is poured from a mixing head outlet strip-wise along a line parallel to and near to the external wall of a mold. After application of the mold release agent area where it is desired not to have adherence of the elastomer to the foam, the foam producing second formulation is poured from the same or different mixing head outlet strip-wise along the line parallel to but nearer to the external wall of the mold than the line of pouring of the first elastomeric forming formulation. The direction of pouring the foam producing second formulation can be in the same direction of the first elastomeric forming formulation or in the opposite direction to the direction of pouring of the first elastomeric forming formulation.

Still in another embodiment the formulations are poured sequentially from at least two mixing heads outlets strip-wise into the inner zone of the mold along different lines across the inner zone of the mold. Normally, the mixing heads are kept vertical relative to the horizontal plane while the formulations are being poured into the mold. However, the mixing heads outlets can be tilted (inclined) relative to the vertical plane while the formulations are being poured into the mold. The speed of movement of the mixing heads outlets above the mold or the speed of movement of the mold relative to the mixing heads can vary between 0.1 and 150, preferably between 0.5 and 30 m/min.

The elastomeric forming formulation may be applied by either pouring or spraying the formulation into the mold. Such processes are known in the art. These include spraying the elastomeric layer with a low or high pressure two component spray machine. The airless two component systems without solvent as disclosed in U.S. Pat. No. 5,071,683, the disclosure of which is incorporated herein by reference, can also be used. Equipment for spraying elastomers is known in the art and such equipment is described in 'The Process of Spray Polyurea Elastomer Systems', D. J. Primeaux II and K. C. Anglin, Proceedings of the $34^{th}$ Annual Polyurethane Technical/Marketing Conference, Oct. 21–24, 1992, pp. 598–600 and 'Reaction Polymers' Wilson F. Gum, Wolfram Riese and Henri Ulrich, Hanser Publishers, New York, 1992.

The resulting elastomeric layer may have a thickness between about 0.1 and about 30 millimeters, preferably between 1 and 20 millimeters. More preferably the final thickness of the elastomer layer is between 2 and 10 millimeters.

The elastomeric layer can be made using any suitable substrate elastomer such as polyurethane, polyurea, polyurethane/polyurea, polyacrylates, polyisoprene, polychloroprene, nitrile, polybutylene, silicone rubbers, block copolymers such as styrene and butadiene or any combination of the above.

In a preferred embodiment, the elastomeric layer is a polyurethane. The polyol and polyisocyanate component present in formulations for producing a polyurethane elastomer can be any of the polyisocyanates/polyols as described below. In a preferred embodiment, the polyol formulation for the first elastomeric forming formulation does not contain water but rather may include an additional organic blowing agent instead. It will generally be desirable to utilize relatively high molecular weight base polyols, with equivalent weights from 700 to 3000, having relatively low hydroxyl numbers. The isocyanate index is generally between 80 and 125, preferably between 100 to 110. A relatively high molecular weight base polyol, with a hydroxyl equivalent weight from 300 to 3,000 having a low hydroxyl number is generally used.

In a preferred embodiment, the elastomeric layer is a microcellular elastomer. In another embodiment of the present invention, the elastomeric layer is a non-cellular elastomer. Precursors for use in the elastomeric forming formulations to render such elastomeric layers are well known in the art.

For a microcellular elastomer, either a frothing technology or a blowing agent could be used to reduce densities. In the case of producing a microcellular elastomer using a blowing agent, the preferred blowing agent is an organic blowing agent. Organic blowing agents include aliphatic hydrocarbons having 1–9 carbon atoms and fully and partially halogenated aliphatic hydrocarbons having 1–4 carbon atoms. Aliphatic hydrocarbons include methane, ethane, propane, n-butane, isobutane, n-pentane, isopentane, neopentane, ethanol, and dimethyl ether. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane, 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons include methyl chloride, methylene chloride, ethyl chloride, 1,1,1-trichloroehtnae, 1,1-dichloro-1-fluoroethane (FCFC-141b), 1-chloro-1,1-difluoroethane (HCFC-142b), 1,1-dichloro-2,2,2-trifluoroethane (HCHC-123) and 1-chloro-1,2,2,2-tetrafluoroethane (HCFC-124). Fully halogenated chlorofluorocarbons include trichloromonofluoromethane (CFC-11) dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Preferably the additional organic blowing agent is a partially halogenated chlorofluorocarbons. Mixtures of the additional organic blowing agent and water can also be used. In this case, the ratio of water to organic blowing agent must be such that the finished molded part still has a self-skin, durable top layer.

The formulation for producing a polyurethane elastomer will generally include a chain extending agent. Such chain extenders are disclosed in U.S. Pat. No. 5,670,601, the disclosure of which is incorporated herein by reference.

As used herein, the term mold release agent refers to conventional mold release agents as well as any other agent that prevents adherence of the elastomer to the foam. Examples include antifoaming agents known in the art, film layers which prevent adhesions of a polyurethane foam, i.e., a polyolefin, such as polyethylene, polypropylene, etc., as well as mold release agents.

The mold release agent is applied to the elastomeric layer on the areas where it is desired not to have adherence of the elastomer to the foam before the elastomeric layer is completely cured. Inner zone 60 is preferably covered to prevent migration of the mold release agent or misapplication of the mold release agent to the inner zone. The release agents according to the invention are used in quantities sufficient to effectuate the non-adherence of the elastomeric layer to the bottom foam layer. Typically, such amounts would be between from 0.1 to 15%, by weight, preferably in quantities of from 0.3 to 9%, by weight, based on the total weight of the multi-layered foam article produced. The agent, upon demolding, adheres to the surface of the elastomeric layer, thereby adhering to the elastomeric layer upon removal from the surface of the mold.

Conventional mold release agents known in the prior art are acceptable. Such agents include those set forth in U.S. Pat. Nos. 4,220,727 and 4,111,861, herein incorporated by reference. Such agents include: (1) mixtures of an aliphatic or aryl carboxylic acid and a polar metal compound; (2) carboxyalkylsiloxanes; (3) aliphatic, glyoximes; and (4) aralkyl quaternary ammonium salts. Such release agents are typically dissolved or dispersed in an organic solvent or water/solvent blend. The presence of the polar metal compound with the aliphatic or aryl carboxylic acids minimizes interference with the cure rate of the polyurethane elastomer. Such interference is related to the reaction of the fatty acid with the catalyst employed in the polyurethane-forming reaction mixture, thereby reducing the amount of effective catalyst in the mixture. The polar metal compound is preferably in the form of a relatively inexpensive salt (e.g. sodium carbonate). The carboxylic acids useful in (1) include linear carboxylic acids such as octanoic, nonanoic, decanoic, undecanoic, dodecanoic, tridecanoic, tetradecanoic, pentadecanoic, hexadecanoic, heptadecanoic, octadecanoic, nonadecanoic, cicosanoic, heneicosanoic, docosanoic, tricosanoic, tetracosanoic, pentacosanoic, hexacosanoic, heptacosanoic, octacosanoic, nonacosanoic, triacontanoic, hentricontanoic, dotriacontanoic, tetratriacontanoic, and sentatrioacontanoic acid. In addition, the carboxylic acid may contain branched carbon chains or pendant carboxyl groups (e.g. iso-lauric or iso-stearic acid). The polar metal compounds contain a metal component selected from the group consisting of bismuth, lead, tin, sodium potassium, or lithium. The metallic ions are present in the urethane mixture in a minor amount relative to the weight parts of fatty acid that are introduced. Suitable carboxyalkylsiloxanes as mold release agents are of the formula:

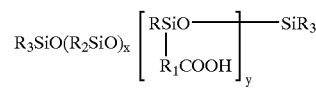

wherein R is a monovalent hydrocarbon radical, $R_1$ is a divalent hydrocarbon radical containing up to 18 carbon atoms which separates the carboxy group from the silicon atom by at least two carbon atoms, x is an integer between 30 and 100, and y is an integer between about 5 and about 20, with the proviso that the acid number of the siloxane is between about 50 and about 300. Illustrative of $R_1$ is any monovalent hydrocarbon radical, such as alkyl (such as methyl, ethyl, n-pentyl, n-dodecyl, n-octadecyl, 2-ethyl-n-hexyl); cycloalkyl (such as cyclobutyl, cyclopentyl, cyclohexyl, and the like); aryl (such as phenyl, naphthyl, biphenyl, and the like); alkenyl (such as vinyl, alkyl, methallyl, 3-butenyl, and the like); alkaryl (such as tolyl, xylyl, 2,4-diethyl-phenyl, 4-dodecylphenyl, and the like); aralkyl (such as phenylethyl, and the like). Illustrative of $R_1$ is an alkylene group, such as ethylene, isopropylene, octadecylene, 2,2,4-trimethylpentylene; cycloalkylene groups such as cyclopropylene, cyclobutylene, cyclooctylene, 1-methyl-2-ethylcyclohexylene, and the like; or an aralkyl group such as, beta-phenylethylene, and the like.

Typical examples of these carboxyalkylsiloxanes are:

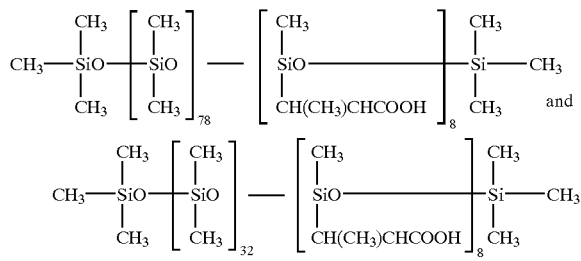

The aliphatic glyoximes for use as mold release agents include those of the formula:

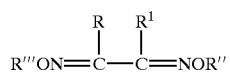

wherein R and $R^1$ are the same or different alkyl or alkoxy groups containing between 1 and about 20 carbon atoms per group, and wherein R" and R'" are hydrogen or alkyl radical containing between 1 and about 15 carbon atoms per group. Typical glyoximes of the invention include dimethyl glyoxime, diethyl glyoxime, dipropyl glyoxime, dibutyl glyoxime, dipentyl glyoxime, and dilauryl glyoxime. The aryl modified aliphatic quanternary ammonium salts of this invention contain between about 15 and about 50 carbon atoms per molecule. Typical salts of the invention include phenyl stearyl trimethyl ammonium chloride, phenyl stearyl lauryl dimethyl ammonium chloride and diphenyl stearyl dimethyl ammonium chloride.

Other mold release agents, known in the art, such as those described in U.S. Pat. Nos. 5,182,034; 3,694,530; 3,640,769; 3,624,190; 3,607,397; 3,726,952; 4,024,088; 4,098,731; 4,130,698; 4,201,847; and 3,413,390, herein incorporated by reference, may be employed.

In a preferred embodiment, the mold release agent is a mixture of hydrocarbon synthetic waxes having high melting points, foam stabilizers and other additives. A particularly preferred mold release agent is that commercially sold as Kluberpur 41-2013 of Kluber Chemie KG.

A mold release agent may further be applied directly to the mold to allow the layers to demold without damaging the article.

Before the elastomeric layer is completely cured, the foam producing second formulation is poured into the open mold. The time interval between spraying the first formulation and pouring the second formulation will vary depending on various factors, such as the reactivity of the components in the formulation, amount and type of catalyst(s) present, etc. A suitable time interval can readily be determined by one skilled in the art. Generally the time interval will be between 1 second to 5 minutes. Preferably the time interval will be from 3 seconds to 3 minutes. More preferably the time interval will be from 5 seconds to 1 minute. Most preferred is a time interval from 10 to 30 seconds.

The foam producing second formulation is applied to all areas including the first elastomeric layer and the layers corresponding to the area to which the mold release agent has been applied. Methods for pouring the foam formulation are known to those skilled in the art. Such processes include pouring the foam into the open mold at one location, point wise at different points of the area to be covered, strip-wise or in spirals. In a preferred method, the foam producing second formulation is poured strip-wise along a line parallel to and near the external wall of the inner zone of the mold. The process and equipment used for pouring the foam producing second formulation is known to those in the art and is generally described in 'Flexible Polyurethanes Foams Chemistry and Technology' by George Woods, Applied Science Publishers, London and New Jersey, 1982, pp. 150–172 and is disclosed in EP Publication 251 659, the disclosure of which is incorporated herein by reference. The foam producing second formulation may also be poured into the open mold by strip-wise addition of the formulation as disclosed in WO 98/25748, the disclosure of which is incorporated herein by reference. After pouring the foam producing second formulation into the mold, the mold is closed and the contents are allowed to expand. After curing, the molded article is demolded in the usual manner.

In another embodiment, particularly when the formulations are added strip-wise, the foam producing second formulation is poured onto the bottom mold surface at a place which has not been wetted by the first elastomeric forming formulation. This process produces a laminar flow of the foam producing second formulation on top of the first elastomeric forming formulation.

By strip-wise pouring means, as that term is used herein, means that a formulation is poured onto the mold at more than one set-spot and the formulation is then allowed to flow through the mold. Thus, the formulations can be poured in lines, zigzag patterns, poured at or near the top of an inclined mold and allowed to flow downward over the mold, pouring at multiple spots, etc. The formulations can also be poured onto a flat mold.

The strip-wise pouring of formulations allows for a longer time interval between pouring of the two formulations than with the fixed (one place) pouring, and produces the flow of the second liquid foam formulation on top of the first liquid formulation. Thus the two step pouring regiment can be accommodated on a dual-hardness foaming equipment with only one mixing head.

The two step strip-wise pouring of the formulations, whether from a single outlet or from two outlets, permits longer pouring time for one formulation than the other formulation. This allows control of relative thickness of both layers. The thickness of the elastomeric layer is generally selected to provide an article with a durable layer while maintaining the comfort of the softer lower layer.

For producing seats for transportation vehicles, the thickness of the foam producing second formulation, when cured, is generally between from about 1 to about 250 mm, preferably from about 35 to about 100 mm.

The foam producing second formulation is preferably one that will produce a polyurethane foam. Any type of flexible polyurethane foam formulations, preferably flexible HR foam, although hot molding and/or semi-rigid and/or rigid foam formulations could also be used. Polyurethane foams are well known in the art and comprise the product obtained by mixing a polyfunctional isocyanate with a polyfunctional active hydrogen containing compound (e.g. a polyether polyol) in the presence of a blowing agent, and other conventional agents and allowing them to react under standard conditions known in the art.

A polyfunctional active hydrogen containing compound includes compounds having at least two hydroxyls, primary or secondary, amines, primary, secondary or tertiary, carboxylic acids or thiol groups per molecule. The term polyurethane as used herein thus includes polymers having linkages such as polyurethane, polyureas, etc. and mixtures thereof.

Compounds having at least two hydroxyl groups per molecule are especially preferred as the foam producing second formulation due to their reactivity with polyisocyanates. Such mixtures are generated in the mixing head and then poured into the open mold through the outlet before the mixture has started to rise, i.e. whilst the foam formulation is still in an essentially liquid state.

The preferred foam producing second formulation useful in the process of the present invention are those producing flexible polyurethane foam, most preferably flexible HR (high resilience) foams. In such a case, multiple streams are fed to the mixing head; one comprising a formulated polyol, i.e. some or all of polyols, polymer polyols, blowing agent, catalysts, silicone surfactants, blowing agents and other additives; the other comprising the polyisocyanate. In another case, multiple streams comprising individual ingredients of the foam formulation or combinations of ingredients of the formulation are fed to the mixing head.

Any known polyether polyol, polyester, blends of polyether polyols, copolymer polyols (such as, for example, SAN, PHD, PIPA), blends of copolymer polyol, blends of polyols with copolymer polyols can be used in the process of the present invention.

Generally for producing a flexible foam, polyols having a functionality of 2 to 5, preferably 2 to 4; and a hydroxyl number of 20-1000, preferably 20 to 700 are used. For applications where one of the formulation is for producing a rigid foam, the polyols have a functionality of 2 to 8, preferably 3 to and a hydroxyl number of 200 to 1,200, preferably 300 to 800.

The polyols are made by oxyalkylation (ethylene oxide, propylene oxide, butylene oxide and the like) of a polyfunctional initiator. The initiators for the production of polyols generally have 2 to 8 functional groups that will react with the oxide. Examples of suitable initiator molecules are water, organic dicarboxylic acids, such as succinic acid, adipic acid, phthalic acid and terephthalic acid and polyhydric, in particular dihydric to octahydric alcohols or dialkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or blends thereof. Other initiators include compounds linear and cyclic compounds containing an amino group such as diethanolamine, triethanolamine and various isomers of toluene diamine.

For both cold cure and hot cure foams, the polyols may be employed in combination with other polyols to vary the load bearing properties. In particular, the formulated polyol may contain polymer polyols which in turn contain finely dispersed or grafted organic or inorganic material to provide improved load bearing properties. Examples of such polymer polyols are graft polymer polyols prepared by polymerizing ethylenically unsaturated monomers e.g. acrylonitrile and/or styrene in a polyether polyol or the so called PHD or PIPA dispersion polymer polyols. The polyether polyol in which the polymerization takes place preferably has the characteristics indicated above in the case of polyols for HR foam.

Any known organic polyisocyanate can be used. These polyisocyanates include those containing at least about two isocyanate groups per molecule, preferably, those containing an average of from about 2.0 to about 3.0 isocyanate groups per molecule. The polyisocyanates can be aromatic and/or aliphatic polyisocyanates and include the toluene diisocyanates, especially mixtures of the 2,4 and 2,6 isomers such as those containing 65% of the 2,4 isomer and 35% of the 2,6 isomer (TDI 65/35), and those containing 80% of the 2,4 isomer and 20% of the 2,6 isomer (TDI 80/20); and polyisocyanate mixtures comprising 2,4'- or 4,4'-methylene diphenylisocyanate (MDI,); hexamethylenediisocyanate (HMDI); polymeric MDI; and isocyanate-terminated prepolymers thereof. Mixtures of two or more polyisocyanates can also be used in the process of the present invention.

The organic polyisocyanates and the isocyanate reactive compounds are reacted in such amounts that the isocyanate index, defined as the number or equivalents of NCO groups divided by the total number of isocyanate reactive hydrogen atom equivalents multiplied by 100 is generally between 50 and 120 and preferably between 75 and 110.

In the process of the present invention, in the foam producing second formulation, water is preferably used as the main blowing agent at the level of from 0.5 to 10, preferably from 2 to 6 parts per hundred parts of polyol. Auxiliary blowing agents such as carboxylic acids or organic or inorganic compounds that liberate gas by reaction with polyisocyanate or under effect of heat, and inert gases such as carbon dioxide, can also be used. Although not preferred, organic blowing agents may be included in the foam producing second formulation.

The first elastomeric and foam producing second formulations may also contain a portion of the polyisocyanate and polyol as a prepolymer, prepared by the reaction of an excess of the polyisocyanate with the polyol to form an isocyanate-terminated prepolymer. The manufacture of prepolymers is within the level of skill in the art.

In addition to the polyisocyanate and polyol components given above, the first elastomeric formulation, and foam producing second formulation generally contain a catalyst. Any known catalyst used in the preparation of polyurethanes such as, for example, amines and metal salts, alone or in combination, can be used. The catalysts are generally used in a quantity of between 0.002 and 10 percent by weight, based on the total quantity of polyol.

The foam producing second formulation will generally contain a cross-linking agent. Examples of cross-linking agents include glycerol, diethanolamine (DEOA) and triethanolamine (TEOA). The crosslinking agent is used in a quantity known to a person skilled in the polyurethane art.

The foam layer may further be a multi-layered foam having two or more foams of different harness as disclosed in EP Publication 251 659 and WO 98/25748.

The process of the present invention can be used in conjunction with other techniques for producing molded foam articles. One such technique is the use of in-mold-coatings. Such a process is known to those skilled in the art and generally involves the spray of mold cavity with the in-mold coating prior to spraying of the elastomeric formulation. The coating forms a bonded thin layer on the surface of the elastomer. Such coatings are commercially available, for example Bomix products available from Ernst Böttler KG, Bomix-Chemie GmbH & Co. The use of in-moldcoatings provides color and also protection of the final product from ultraviolet radiation and thus typically contains a colorant, UV absorbing or UV stabilizing material. Alternatively the article could be post-painted with an UV stable coating.

The present invention is also directed to multi-layered foam articles which contain three or more layers of different hardness and/or density as the foam producing second formulation. Such foamed articles are produced by pouring sequentially into the mold foam formulations that produce a softer foam and/or foam of lower density. For example, a foam producing second formulation could be introduced followed by a viscoelastic foam, and a third composition which produces a flexible foam. Processes for producing multilayered foams with different density or hardness are disclosed, for example, in EP Publications 251 659; 393 829; 472 574; and 782 969 and U.S. Pat. Nos. 4,190,697 and 4,726,086.

Such a process would comprise (a) pouring from a mixing head outlet, a first elastomeric forming formulation designed to produce an elastomeric layer into the mold and before the elastomeric layer has cured; (b) introducing the mold release agent to the elastomeric layer in the area where it is desired not to have adherence of the elastomer to the foam; (c) pouring from the same or different mixing head outlet, a foam producing second formulation and allowing the foam producing second formulation to spread on top of the elastomeric layer, and before complete curing of the first elastomeric layer and foam producing second formulations; (d) pouring from the same or different mixing head outlet, a third formulation designed to produce a foam having a different density and/or hardness than the foam of (c) into the mold and allowing the third liquid foam formulation to spread on top of the foam producing second formulation.

Variations to the processes disclosed above will be apparent to one skilled in the art. For example, a seat can be prepared by a process comprising spraying the whole cavity of an open mold with a first elastomeric forming formulation to form an elastomeric, followed by pouring an additional elastomer formulation into the mold, and prior to the complete cure of the elastomeric layer and subsequent to the application of the release agent to the area where it is desired not to have adherence of the elastomer to the foam, pouring into the mold the foam producing second formulation. The cured layer resulting from the foam-producing second formulation has an overall density of 15 to 80 kg/m$^3$. In a similar manner, the contour portion of the mold, i.e. for producing side rolls, can be sprayed with an elastomer formulation that differs from the formulation used to spray the inner zone. Alternatively, there can be variation on the amount of the elastomeric forming formulation sprayed/poured on the various surfaces of the mold to vary the thickness of the resulting elastomeric layer and thus vary the physical properties of various portions of the final molded article.

In the case that UV stable articles are required, a UV stable coating of different colors could be applied as a first layer. In this case, a three layer article would be produced. Spray application is the preferred technique for such UV stable coating. In the process described above, the UV coating of different colors as specified, is sprayed into the mold. Then, the first elastomeric forming formulation is sprayed in the open mold. The UV stable coating will protect the first elastomeric layer from color changes or degradation. The first elastomeric layer could have ingredients in the formulation, to protect the article from color changes or degradation. In this case, the UV stable coating may not be needed.

Other known additives such as, for example, silicone surfactants, pigments, fillers, flame retardants and plasticizers can also be used in the process of the present invention. The additives are used in a quantity known to a person skilled in the polyurethane art.

The polyurethane formulations used in the process of the present invention are preferably chosen such that they differ in hardness (load bearing) from each other. It is further preferred that such formulations differ in hardness by virtue of their content of one or more of the following: (a) polyols, (b) polyisocyanates with a functionality greater than two, that is, with more than two isocyanate groups per molecule, (c) active hydrogen containing compound which may be chain extender or crosslinker, and, when used, (d) blowing agent.

The process of the present invention may also be used to cover a rigid or semi-rigid foam behind the first elastomeric layer. When the first elastomeric layer is used to cover a rigid or semi-rigid foam, such article would be applicable for applications in sound and/or thermal insulation and/or other energy management parts. Temperature of the liquid formulations (polyol and polyisocyanate components) can vary between 10 and 80, preferably between 15 and 35° C.

During pouring operation, molds are kept at a temperature ranging between 20 and 80, preferably between 35 and 75° C.

The molded polyurethane articles are cured at a temperature of between room temperature and 250° C. conveniently for a period of time between 2 and 20 minutes, before demolding.

The following examples are given to illustrate the invention and should not be interpreted as limiting in anyway. Unless stated otherwise all parts and percentages are given by weight.

The following designations, symbols, terms and abbreviations are used in the Examples below:

CP-6001 is a glycerol initiated polyol a having molecular weight of approximately 6,000, available from The Dow Chemical Company under the trademark VORANOL CP 6001.

Voranol-CP-4702 is a glycerol initiated polyol having a molecular weight of 5000, sold by The Dow Chemical Company.

Kluber 41-2103 is a mold release sold by Kluber Chemie KG.

Voranol 4053 is a cell opener sold by The Dow Chemical Company.

DEOA is diethanolamine.

Dabco 33LV is a 33 percent solution of triethylene diamine in dipropylene glycol sold by Air Products and Chemicals Inc. under the trademark DABCO 33LV.

Dabco T12 is dibutyltin dilaurate sold by Air Products and Chemicals, Inc. under the trademark DABCO T12.

Niax A-1 is a 70 percent solution of bis (dimethylaminoethyl)ether in dipropylene glycol sold by CK Witco under the trademark NIAX A-1.

Silicone Tegostab B 8715 is a silicone surfactant sold by Th. Goldschmidt AG.

Additive DT is a substituted aromatic diamine and is available from Bayer AG under the trade name Haeter DT.

NC-700 is a reactive high solids copolymer polyol sold by The Dow Chemical Company under the trademark SPECFLEX NC 700.

NC 632 is an ethylene oxide capped polyol having a hydroxyl equivalent weight of approximately 1750, hydroxyl number range of 30.5–34.5. NC 632 is available from The Dow Chemical Company under the Trademark SPECFLEX NC 632.

NE 181 is a methylene diphenyl-diisocyanate based prepolymer with free isocyanate content of 30% available from The Dow Chemical Company under the Trademark SPECFLEX NE 181.

The following example will illustrate the practice of the present invention in a preferred embodiments. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow. All parts are given in terms of weight units except as may otherwise be indicated.

EXAMPLE

Mold type: Alicante prototype cushion. (aluminum). Mold temperature: 65° C.

Step 1)

Mold release agent Kluber 41-2013 was sprayed onto the whole mold cavity.

Step 2)

A 2-component, grey anthracite polyurethane in-mold coating from bomix-Chemie GmbH & Co (prepared from bomix 1053/77 and hardener 66/111 at a ratio 100:20) was applied to the whole mold cavity.

Step 3)

An elastomeric formulation was sprayed into the whole mold cavity using a Low Pressure Unipre M 12 machine. Polyol and Isocyanate tanks were both heated at 40° C. The output was 0.79 liter/min. The Polyol/Iso ratio was 100:45 at index 90. The composition of the elastomeric formulation is given below:

| Formulated Polyol Composition: | Pbw |
|---|---|
| VORANOL CP 4702 | 67.12 |
| SPECFLEX NC 700 | 25.65 |
| DETDA | 6.50 |
| Dabco 33LV | 0.18 |
| Dabco T12 | 0.075 |
| Additive DT (from Bayer) | 1.0 |
| Isocyanate MDI prepolymer 208/121/01 | 45 |
| (% FNCO of 9.88%) | (at index 90) |

Step 4)

Two minutes after spraying the elastomer layer, the central part of the mold cushion delimited by A–A' and B–B' was protected by placing on top of it, a cardboard having the same shape. Then, the mold release agent Kluber 41-2013 was applied but only on the side rolls this time.

Step 5)

The protective cardboard was removed from the central part of the cushion and a flexible MDI foam was poured to the whole mold cavity using a Krauss Maffei RIMSTAR 40 high pressure machine. The mixing head outlet was mounted on a 5-axes ASEA 90 robot. The composition of the molded flexible foam formulation was as follows:

| Soft formulated polyol | Pbw |
|---|---|
| VORANOL CP 6001 | 49.5 |
| VORANOL 4053 | 1.0 |
| SPECFLEX NC 632 | 49.5 |

| Soft formulated polyol | Pbw |
|---|---|
| Water | 3.71 |
| DEOA 85% | 0.59 |
| Niax A-1 | 0.15 |
| Dabco 33LV | 0.40 |
| Silicone Tegostab B 8715 | 0.50 |
| Isocyanate MDI prepolymer | 62.1 |
| SPECFLEX NE 181 | (at index 90) |

After pouring of the MDI foam, the mold was closed and after 2'30 sec the part was demolded and crushed. The resulting car seat cushion has a central seating zone (delimited by A–A' and B–B') which shows a good adhesion between the in-mold coating layer and the sprayed elastomeric layer but also between this latter and the flexible MDI foam. To the contrary and due to the release agent used in Step 4, the side rolls (raised support) show a good adhesion between the in-mold coating layer and the sprayed elastomeric layer but here is no adhesion between the sprayed elastomeric layer and the flexible foam poured on top. This phenomenon creates air zones in between the sprayed elastomeric layer and the flexible foam underneath. As a result, when passing the hand on the side rolls they feel smother than the central part of the cushion.

From the foregoing, it will be observed that numerous variations and modifications may be effected without departing from the true spirit and scope of the novel concepts of the invention.

What is claimed is:

1. A process for producing a multi-layered foam article which comprises:

(a) pouring a first elastomeric forming formulation into a mold to render a first elastomeric layer;

(b) applying a release agent to the first elastomeric layer;

(c) before the first elastomeric forming liquid formulation has fully cured, pouring a foam producing second formulation on top of the release agent; and (d) after the first elastomeric forming formulation and foam producing second formulations have cured, demolding the resulting product, wherein the release agent is applied in an amount sufficient to prevent adherence of the foam producing second formulation, when cured, to the cured first elastomeric layer.

2. The process of claim 1, wherein the first elastomeric layer is a polyurethane, polyurea, polyacrylate, polyisoprene, polychloroprene, nitrile, polybutylene, silicone rubber, block copolymer of styrene and butadiene, or a combination thereof.

3. The process of claim 2, wherein the first elastomeric layer is a polyurethane.

4. The process of claim 3, wherein the first elastomeric layer is microcellular.

5. The process of claim 1, wherein the foam producing second formulation is an isocyanate and a hydrogen active compound.

6. The process of claim 5, wherein the isocyanate is an aromatic isocyanate.

7. The process of claim 1, wherein the release agent is a wax-based mold release agent.

8. The process of claim 1, wherein prior to step (a), an in-mold coating is applied to the mold.

9. The process of claim 8, wherein the in-mold coating contains a colorant or an UV absorbing or stabilizing material.

10. A process for preparing a multi-layered seat having at least one raised peripheral support and an inner zone which comprises:
- (a) pouring a first elastomeric forming formulation into a mold having areas defining the inner zone and the at least one raised peripheral support for the resulting seat and forming an elastomeric layer;
- (b) applying onto the elastomeric layer in the areas corresponding to the raised peripheral support a release agent;
- (c) applying onto the elastomeric layer of the inner zone of step (a) and the mold release agent of step (b), before the first elastomeric forming formulation cures, a foam producing second formulation; and
- (d) after the first elastomeric forming formulation and the foam producing second formulation cure, demolding the seat wherein the release agent is applied in an amount sufficient to prevent adherence of the foam producing second formulation to the first elastomeric forming formulation.

11. The process of claim 10, wherein the first elastomeric forming liquid formulation and foam producing second formulation render layers of different hardness.

12. The process of claim 11, wherein the foam producing second formulation is poured strip-wise over the inner zone.

13. The process of claim 10, wherein an in-mold coating is applied to the mold prior to step (a).

14. The process of claim 13, wherein the in-mold coating contains a colorant or stabilizing material.

15. The process of claim 10, wherein the elastomeric layer is polyurethane, polyurea, polyacrylate, polyisoprene, polychloroprene, nitrile, polybutylene, silicone rubber, a block copolymer of styrene and butadiene, or a combination thereof.

16. The process of claim 10, wherein the release agent is a wax-based mold release agent.

* * * * *